United States Patent
Verhaeghe

(10) Patent No.: US 9,439,359 B2
(45) Date of Patent: Sep. 13, 2016

(54) AGRICULTURAL SQUARE BALER

(71) Applicant: CNH Industrial America LLC, New Holland, PA (US)

(72) Inventor: Didier O. M. Verhaeghe, Ypres (BE)

(73) Assignee: CNH Industrial America LLC, New Holland, PA (US)

(*) Notice: Subject to any disclaimer, the term of this patent is extended or adjusted under 35 U.S.C. 154(b) by 43 days.

(21) Appl. No.: 14/380,604

(22) PCT Filed: Feb. 18, 2013

(86) PCT No.: PCT/EP2013/053145
§ 371 (c)(1),
(2) Date: Aug. 22, 2014

(87) PCT Pub. No.: WO2013/124227
PCT Pub. Date: Aug. 29, 2013

(65) Prior Publication Data
US 2015/0296716 A1    Oct. 22, 2015

(30) Foreign Application Priority Data
Feb. 22, 2012  (BE) ............... BE2012/0105

(51) Int. Cl.
| | | |
|---|---|---|
| A01F 15/10 | (2006.01) | |
| A01F 15/04 | (2006.01) | |
| B30B 9/30 | (2006.01) | |
| A01D 61/02 | (2006.01) | |

(52) U.S. Cl.
CPC ............. *A01F 15/101* (2013.01); *A01F 15/04* (2013.01); *A01F 2015/102* (2013.01)

(58) Field of Classification Search
CPC ...... A01F 15/04; A01F 15/046; A01F 15/10; A01F 15/101; A01F 2015/102; A01F 2015/103; A01F 2015/105; A01D 61/02; B30B 9/301

USPC ........... 100/7, 179, 188 R, 189; 56/341, 344, 56/432
See application file for complete search history.

(56) References Cited

U.S. PATENT DOCUMENTS

| | | | | |
|---|---|---|---|---|
| 2,122,052 A | * | 6/1938 | Bell ...................... | A01D 61/02 198/604 |
| 2,381,620 A | | 8/1945 | Russell | |
| 2,400,667 A | * | 5/1946 | Toews ................... | A01D 61/02 144/245.2 |
| 2,552,888 A | | 5/1951 | Druetta | |
| 2,637,436 A | * | 5/1953 | Andrews ............... | A01D 61/02 198/726 |

(Continued)

FOREIGN PATENT DOCUMENTS

| | | |
|---|---|---|
| DE | 3004431 A1 | 8/1981 |
| FR | 895746 A | 2/1945 |

*Primary Examiner* — Jimmy T. Nguyen
(74) *Attorney, Agent, or Firm* — Patrick M. Sheldrake

(57) ABSTRACT

An agricultural square baler equipped with a pre-compression chamber and configured to guide crop material towards and into the baling chamber where rectangular bales are formed. At least one of the upper and lower walls of the pre-compression chamber is formed by a conveyor belt, arranged to move from the supply towards the baling chamber. The conveyor belt has at least two portions configured to exert different friction forces on a batch of crop material, so that the high friction portion is capable of moving the batch into the baling chamber, whereas the low friction portion exerts a low force on the batch, thereby preventing material to be prematurely moved towards the baling chamber.

14 Claims, 4 Drawing Sheets

(56) References Cited

U.S. PATENT DOCUMENTS

| | | | |
|---|---|---|---|
| 2,687,209 A * | 8/1954 | Fabian | A01D 61/02 198/500 |
| 2,941,679 A * | 6/1960 | Miller | B65F 3/18 198/732 |
| 5,092,114 A | 3/1992 | Eggenmueller | |
| 5,467,702 A | 11/1995 | Naaktgeboren et al. | |
| 7,047,719 B2 | 5/2006 | Dubois | |
| 7,543,428 B1 * | 6/2009 | Puryk | A01D 57/20 430/127 |
| 2012/0000377 A1 * | 1/2012 | Verhaeghe | A01F 15/0825 100/45 |
| 2012/0247348 A1 * | 10/2012 | Herron | A01F 15/0825 100/35 |

* cited by examiner

AGRICULTURAL SQUARE BALER

This application is the US National Stage filing of International Application Serial No. PCT/EP2013/053145 filed on Feb. 18, 2013 which claims priority to Belgian Application BE2012/0105 filed Feb. 22, 2012, each of which is incorporated herein by reference in its entirety.

FIELD OF THE INVENTION

The present invention is related to agricultural square balers, used for picking up crop material such as hay or straw from the field or receiving crop material such as cotton from a harvester, and forming it into rectangular packages. The invention is in particular related to a feeding system for feeding crop material into the baling chamber.

STATE OF THE ART

Agricultural square balers gather crop material into a baling chamber where the material is compressed by a reciprocating plunger to form rectangular packages. The crop material is supplied by a supply system into a pre-compression chamber, which is often a curved chamber arranged between the outlet of the supply system and the inlet of the baling chamber. Examples of existing systems of this type are disclosed in US-A-2005/0072133 and EP-A-0636308. In these existing systems, a stuffer arrangement is used that is equipped with rotating forks or blades which cut into the crop material at the bottom of the pre-compression chamber, and subsequently sweep the material that has gathered in the pre-compression chamber into the baling chamber. The movement of the stuffer and of the plunger is synchronized so that the plunger is moved backwards before the crops are fed into the baling chamber and forwards as soon as the material has fully entered the baling chamber.

A problem of the rotating fork/blade arrangements for stuffing the material into the baling chamber is that they are mechanically complex and therefore problematic when it comes to working at the ever increasing production speeds that are required in the present-day agricultural business.

Conveyor-based systems for advancing crops towards the baling chamber have also been documented. Some older baling systems of this type are shown in documents FR-A-895746 and U.S. Pat. No. 2,552,888, where conveyors are applied for advancing material towards the baling chamber. A problem with applying these systems in a pre-compression chamber is that material may be forwarded by the conveyor towards the baling chamber before the plunger is in the correctly retracted position. On the other hand, the force exerted by a conveyor on a compressed batch of material may be insufficient to quickly propel the batch into the baling chamber. This results in an inefficient emptying cycle of the pre-compression chamber, with material being left behind in the pre-compression chamber, which is furthermore at risk of becoming entangled in the conveyor surface.

AIMS OF THE INVENTION

The present invention aims to provide a square baler with a stuffer arrangement that is technically straightforward and capable of working at high speeds. The aim is in particular to propose a conveyor-based stuffer arrangement that overcomes the problems of existing system of this type.

SUMMARY OF THE INVENTION

The present invention is related to an agricultural square baler and to a method as described in the appended claims.

According to a first aspect, the invention is related to agricultural square baler comprising:
- a pre-compression chamber, having an inlet section, an outlet section and an upper and lower wall defining a channel between said inlet and outlet sections,
- a crop material supply means configured to supply crop material to said inlet section,
- a baling chamber having an inlet connected to the outlet of said pre-compression chamber so that pre-compressed material may be transported from the pre-compression chamber to the baling chamber, the latter being further equipped with a plunger for forming rectangular bales,
- at least one conveyor belt configured to form at least a portion of said upper and/or lower wall of the pre-compression chamber, said conveyor belt being further configured so that the movement of the belt in said portion of the upper and/or lower wall takes place from the inlet towards the outlet (8) of the pre-compression chamber, wherein said conveyor belt comprises a least two portions which are adjacently arranged in the direction of movement of the belt, said portions being configured to exert substantially different friction forces on material present in the pre-compression chamber.

The high friction portion is configured to be able to exert a sufficient force on a batch of crop material present in the pre-compression chamber, to grip said batch and move it into the baling chamber. The low friction portion is configured to exert a force on the crop material that is insufficient to move a batch of crop material present in the pre-compression chamber into the baling chamber. More preferably, the low friction portion is configured to exert a force on any material present in the pre-compression chamber that is insufficient to substantially move said material in the direction of the movement of said low friction portion.

According to a second aspect, the invention is related to a method for providing crop material to the baling chamber of a square baler according to the first aspect of the invention, said method comprising the steps of:
- Filling the pre-compression chamber with crop material supplied by said supply means, while said conveyor belt(s) are moving,
- When said pre-compression chamber is filled with a batch of crop material, propelling said batch into the baling chamber by gripping the batch through the friction force exerted on said batch by a high friction portion of said conveyor belt(s), thereby emptying the pre-compression chamber,
- Repeating said steps of filling and emptying the pre-compression chamber.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1A:
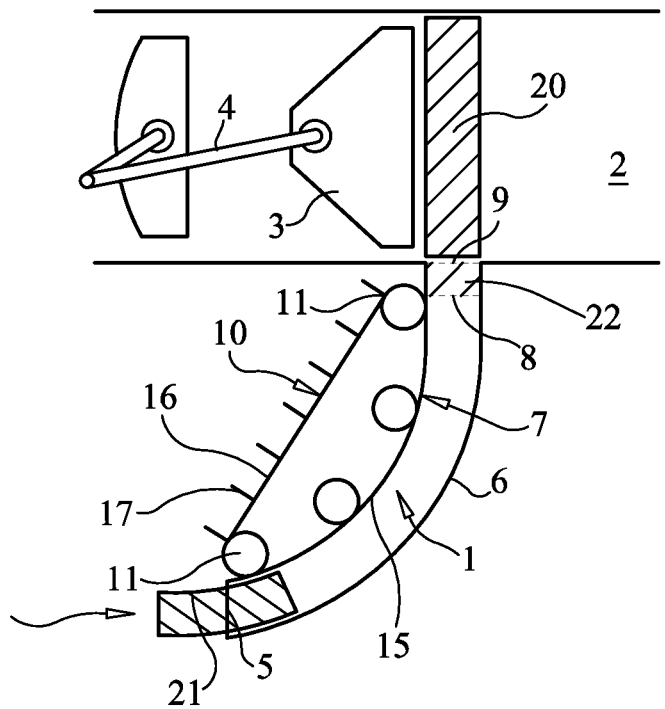
FIGS. 1a to 1d illustrate the operation of a rectangular square baler according to an embodiment of the invention.

FIGS. 1a to 1d illustrate the filling and emptying cycle of a pre-compression chamber in a square baler according to the invention. First the components and the general principle of the feeding mechanism applied in a square baler of the invention will be explained with reference to FIG. 1a alone. For the sake of simplicity, the drawings show only the pre-compression chamber 1 and the baling chamber 2 equipped with a reciprocating bale plunger 3 powered by a crank mechanism 4. A suitable supply system (not shown) delivers crop material into the pre-compression chamber 1 through this chamber's inlet section 5. The interior of the pre-compression chamber forms a channel area situated between lower and upper walls 6 and 7 and leading from the chamber's inlet section 5 to its outlet section 8. Lower wall 6 is fixed and curve-shaped, bending upwards from the inlet section 5 to the outlet section 8 and from there to the outlet 9 of the baling chamber connected to said outlet 8 (or the outlet 8 and inlet 9 may coincide). The upper wall 7 of the pre-compression chamber is equally curved and essentially parallel to the lower wall 6. However, the upper wall 7 and lower wall 6 may be placed in a diverting manner towards the outlet section 8 of the pre-compression chamber 1. The upper wall 7 is formed by a rotatable conveyor belt 10, actuated by a set of rolls 11, one of which is powered by a suitable motor (not shown). Movement of the conveyor belt is actuated so that the moving belt portion that forms the upper wall 7 moves from the pre-compression chamber's inlet 5 towards its outlet 8. The surface of the conveyor belt 10 is divided into two adjacent portions, each portion extending along the width of the conveyor (as seen in the direction perpendicular to the drawings), wherein the second portion is configured to exert a higher friction force on the crop material than the first portion. Preferably, each of the portions 15/16 extends over half the complete length of the conveyer belt 10. In the example shown, the first portion 15 has a smooth surface, whereas the second portion 16 is provided with protruding tines or paddles 17. The length of the two portions 15/16 as measured in the direction of movement of the conveyor is essentially the same, so that each portion may cover more or less the totality of the pre-compression chamber's upper wall 17. However, the first portion 15 may be significantly longer than the second portion 16, as shown in FIG. 1a, due to the presence of guide rolls which will guide the conveyor such that a specific shape of the pre-compression chamber 1 is created. Likewise, the first portion 15 may be significantly shorter than the second portion 16 if e.g. a tensioning system is used to take up any slack which may occur in the conveyor over time. When installing such a tensioning system on e.g. roll 11' of FIG. 4 or 5, the conveyor will be pulled away from the normal line of travel between the set of rolls 11. By doing so, an additional length of conveyor in the second portion 16 needs to be foreseen, to overcome the additional length of travel the conveyor will need to accomplish. The movement of the conveyor therefore results in the low-friction portion 15 and the high-friction portion 16 alternately moving past the pre-compression chamber's channel area. Different forces are exerted on the crop material by the smooth portion and by the high friction portion. This alteration is used to advantage in that the high friction portion is capable of exerting a high propulsion force on a batch of pre-compressed material at a high density, without requiring separate stuffer blades or forks. At the same time, the low friction portion inhibits premature filling and/or emptying of the pre-compression chamber and also diminishes the danger of crop material at a lower density then needed when being the crop material should be fed to the baling chamber, attaching itself to the conveyor. The movement of the baling plunger 3 is synchronized with the filling and emptying cycle of the pre-compression chamber 1, as in the prior art machines.

Figure 1B:
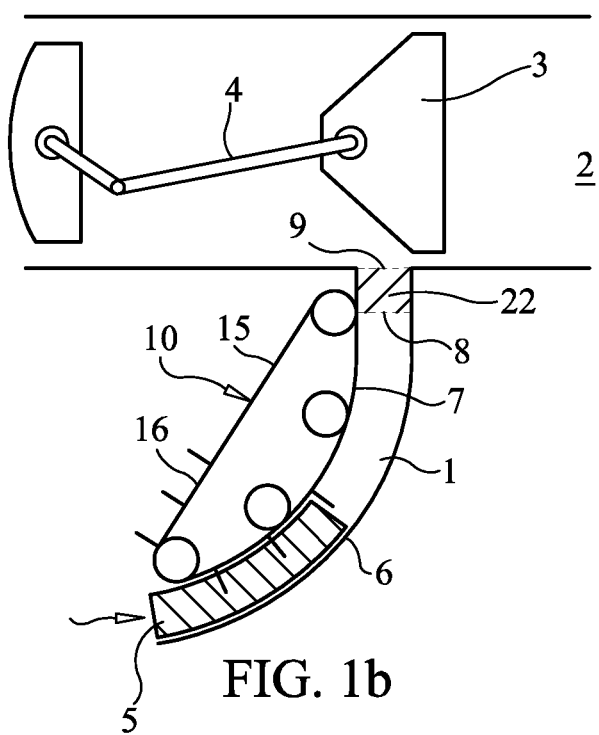
Figure 1C:
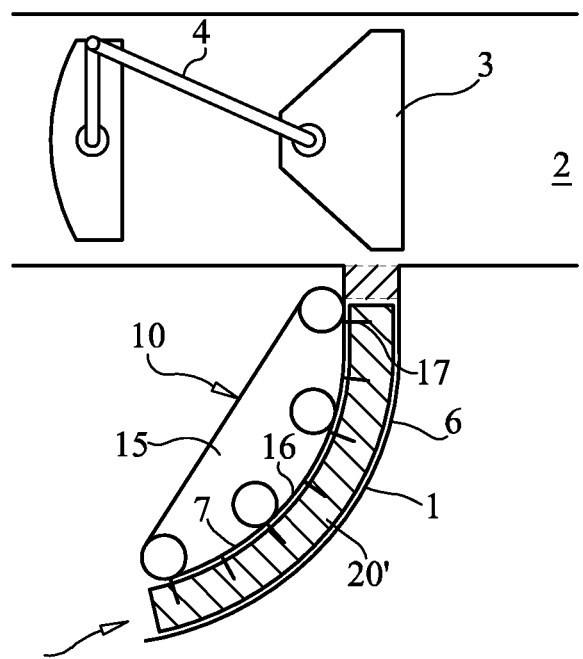
Figure 1D:
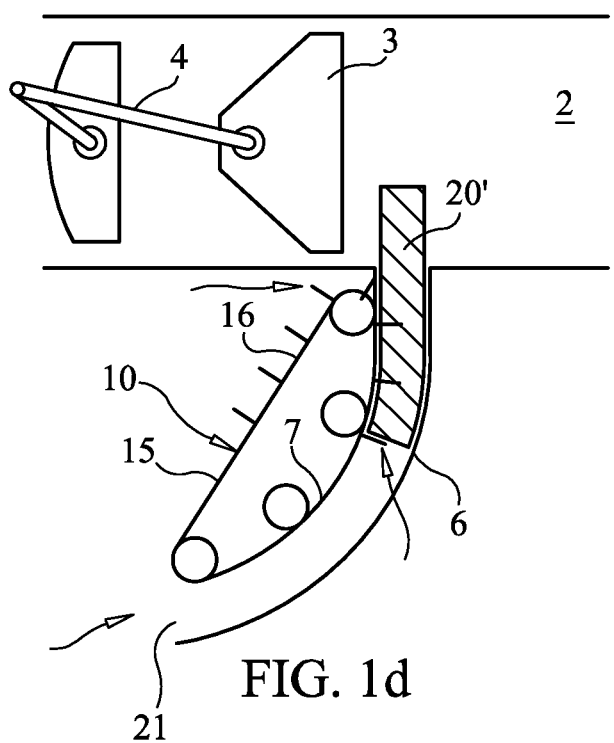
Figure 2:
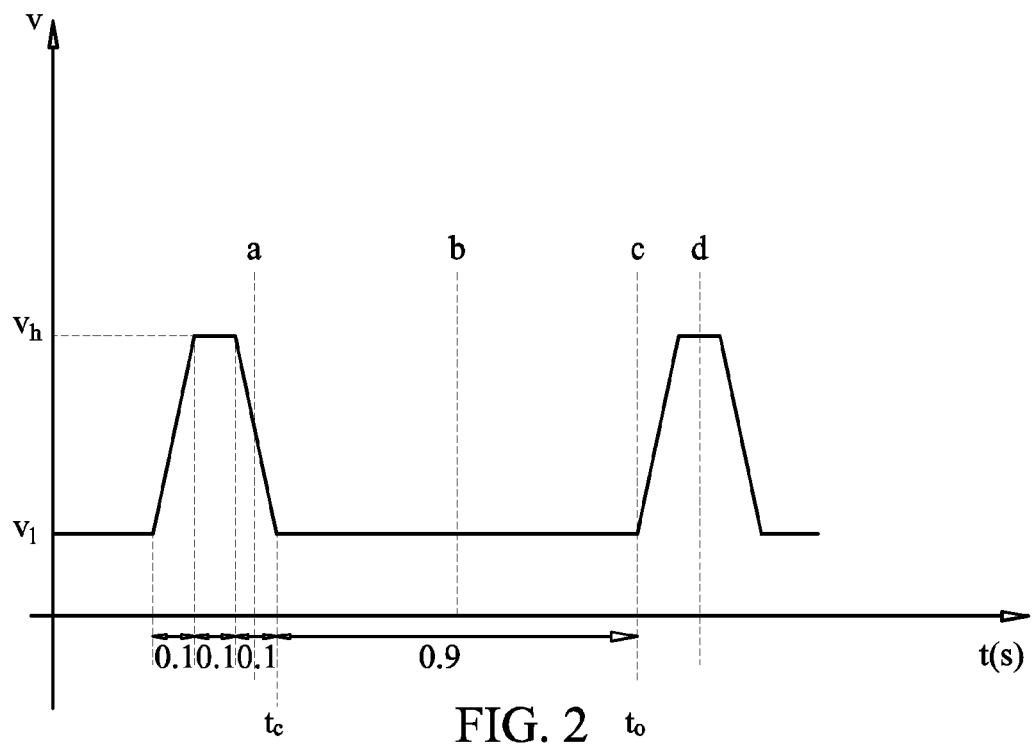
FIG. 2 shows the variation of the speed of the conveyor belt applied in a square baler according to an embodiment of the invention.

The general principle described above can be brought into practice in various ways in terms of the dimensions of the high and low friction portions, the exact timing of their passage along the pre-compression's side wall, and in terms of the speed at which the conveyor is operated. Preferably, the speed varies between a high and low speed according to a predefined cycle. FIGS. 1a to 1d illustrate subsequent stages in one filling cycle where such a speed variation is applied between a high value $v_h$ and a low value $v_l$. The values of these speed levels may be chosen in accordance with the capacity 1:n, with n the number of plunger cycles corresponding to one filling cycle. According to a preferred embodiment, a given value $v_l$ is chosen as the low speed value for n=1. For higher capacity values n, the low speed is reduced to $v_l/n$, so the low speed is for example $v_l$ $v_l/2$, $v_l/3$ for 1:1, 1:2 or 1:3 capacity. The high speed value $v_h$ is preferably independent of the capacity. The filling cycle is shown in FIG. 2, which also indicates the points of the cycle corresponding to the stages shown in FIGS. 1a to 1d. Realistic but purely exemplary values of the conveyor dimensions are: a width of 1.2 m and a length from the inlet 5 to the outlet 8 of the pre-compression chamber of 0.9 m. FIG. 2 shows realistic but again exemplary values of the timespan of a cycle and of various sub-timespans. In the situation shown in FIG. 1a, the full length of the high friction portion 16 is turned away from the pre-compression chamber, i.e. the upper wall 7 of said chamber is formed completely by the smooth conveyor portion 15. The moment in the cycle shown in FIG. 1a is the moment just after a complete batch 20 of compressed material has been propelled at high speed into the baling chamber, where it is ready to be pushed to one side by the plunger 3. At this moment, the speed of the conveyor is changing from the high value $v_h$ to the low value $v_l$. The pre-compression chamber is thus virtually empty apart from a first portion 21 of material being fed into the chamber at the bottom, and possibly some leftover material 22 from the previous batch at the top. FIG. 1b shows the next stage in the cycle. The conveyor is moving at low speed as more material is fed into the pre-compression chamber. The tines 17 that are entering the pre-compression chamber push said material forward in the lower half of the chamber. However, in the upper half of the chamber, the smooth surface 15 is still present. The bit of leftover material 22 therefore cannot get carried away by the conveyor belt, because the smooth portion 15 is incapable of exerting a sufficient force on the leftover material 22 which is at a lower density. When the pre-compressed crop material 20 is inserted in the baling chamber 2, and the left over material 22 is still in the pre-compression chamber 1, the material 22 will be at such a low density, making it difficult for the conveyor, now having a smooth surface touching the crop material 20, to move the material even more upwards and into the baling chamber 2. By the continued driving of the machine on the field, additional crop material 21 will be brought into the pre-compression chamber and an increase in density will be accomplished by a continued movement of the conveyor. In fact, the high friction portion 16 of the conveyor will start to make contact with the newly fed material 21 and will move it upwards into the pre-compression chamber. The material 21 which is fed inside the pre-compression chamber, will be compressed thus increasing the density, while simultaneously feeding the crop material upwards towards the baling chamber. In the next stage shown in FIG. 1c, the pre-compression chamber is completely filled with a new batch 20' of crop material, and the high friction portion 16 is now fully turned towards the interior of the pre-compression chamber. At this moment, the speed is increased from $v_1$ to $v_h$. The conveyor's grip on the batch 20' of material inside the chamber is at a maximum at this point, and the batch is thus easily gripped and propelled upwards and into the baling chamber, as illustrated in FIG. 1d. During this emptying stage, no or very little new material enters the chamber at the bottom, because of the low friction surface that now passes before the inlet 5. After that, the cycle returns to the situation of FIG. 1a, and so on.

As stated, the speeds and timing of the various zones may be chosen according to the need and application. A constant conveyor speed is less ideal than a variable speed, but in combination with the high/low friction portions it may nevertheless be applied to advantage. In this case, the speed of the conveyor belt is preferably chosen so that when the low friction portion 15 moves past the pre-compression chamber's interior, enough crop material has already been fed into said chamber from the crop supply system to fill the pre-compression chamber 1. The low friction portion 15 of the conveyor may exert enough force to help the advance of said material into the chamber, but does not exert a high force on the material which is thus allowed to gather into the chamber without being pushed towards the baling chamber 2 at the wrong moment or without being overly compressed. Then the high-friction portion 16 moves past the pre-compression chamber's interior. At this moment, the pre-compression chamber is substantially filled with a pre-compressed batch of crop material. The high friction portion 16 exerts a high force on this load, sufficient to propel it into the baling chamber 2. The previous paragraphs describe embodiments of the method according to the invention.

In stead of being provided with tines or paddles 17, the high friction portion 16 of the conveyor may be formed by a material with a high friction coefficient in relation to the crop material. In stead of a continuous portion of high friction material, the conveyor may comprise several smaller high-friction portions with smooth portions in between as seen in the direction of the width of the conveyor.

Also, in stead of one smooth portion and one high friction portion adjacently arranged in the direction of the conveyor's movement, several of these portions may be arranged alternately in said direction. The shape of the pre-compression chamber may be straight in stead of curved. The conveyor belt material may be plastic or metal. The belt may be a toothed belt, cooperating with toothed rolls 11, which allows a precise synchronization of the belt movement with the plunger movement in the baling chamber. The baling plunger 3 may be powered by a gearbox driven at a constant speed, as in EP0636308. Alternatively, the plunger may be driven by a hydraulic drive, as in US2005072133 or by an electric motor.

Figure 3:
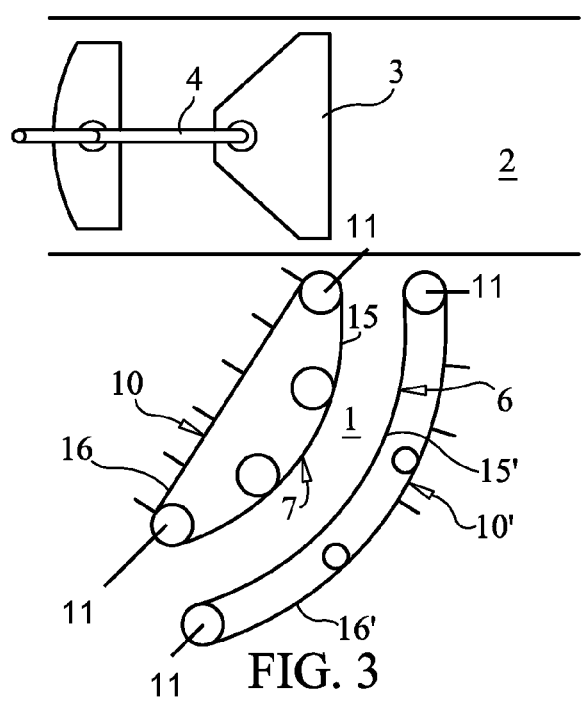
FIG. 3 shows an embodiment of a square baler according to the invention, provided with two conveyor belts.

FIG. 3 shows another embodiment, wherein conveyor belts are arranged on both sides of the pre-compression chamber. Both high-friction portions 16/16' are preferably configured to enter the pre-compression chamber's channel area simultaneously, so as to increase the force with which a compressed batch is propelled upwards.

Preferably, the length of the moving portion of the conveyor belt that forms an inside wall of the pre-compression chamber 1 corresponds to the totality of said wall, as shown in the drawings. In other words, the 2 outermost drive rolls 11 are situated at the inlet and outlet 5/8 respectively of the pre-compression chamber 1. According to another embodiment, the conveyor extends over only a portion of the length of the pre-compression channel, or several smaller conveyors are arranged along said length. According to still another embodiment, the conveyor belt extends over a larger distance than the length of the pre-compression chamber.

Figure 4:
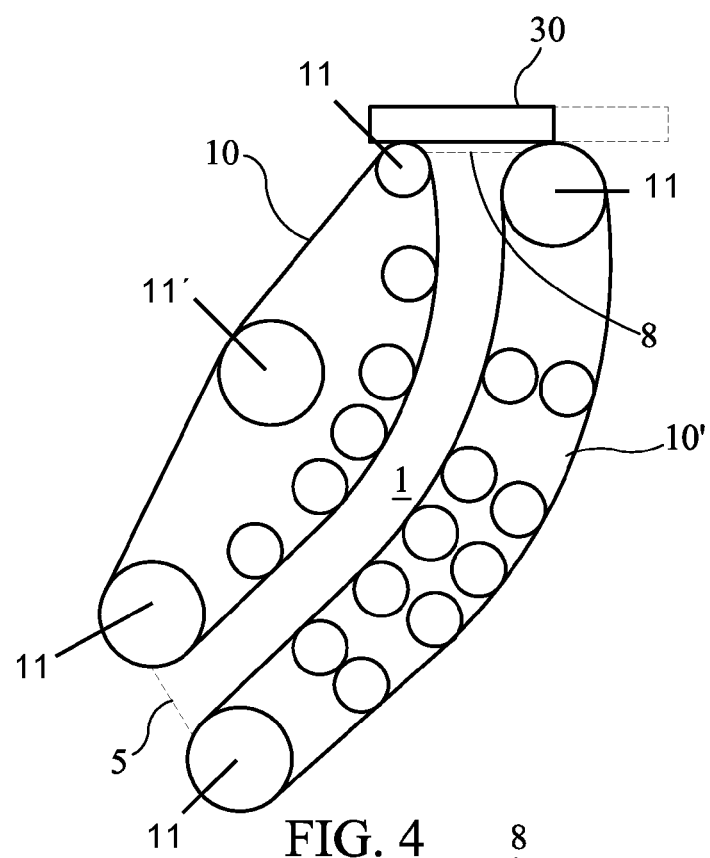
FIGS. 4 and 5 shows embodiments of a conveyor belt arrangement further equipped with blocking means respectively at the inlet and the outlet of the pre-compression chamber.
Figure 5:
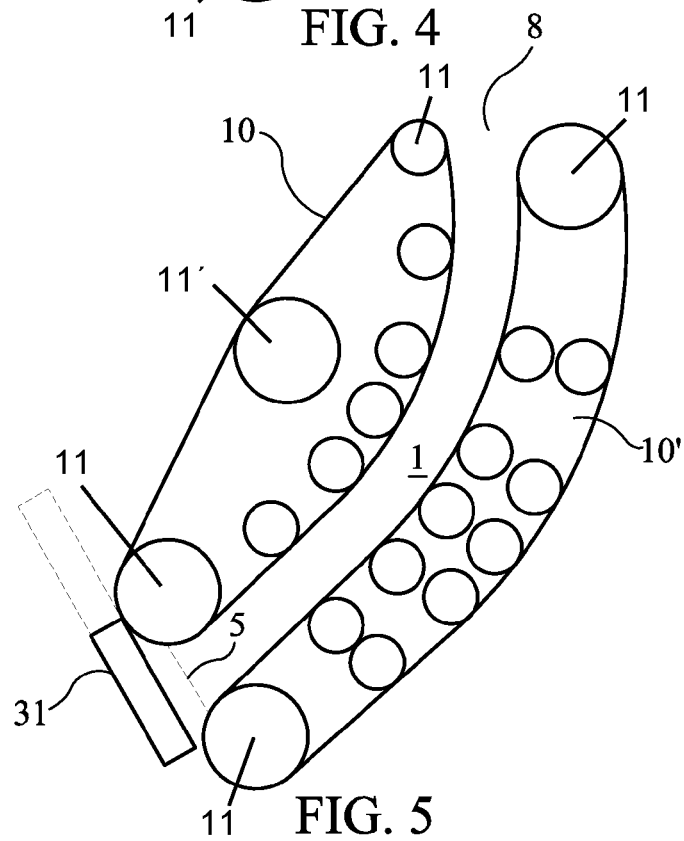

In addition to the embodiments described above, a square baler according to the invention may be equipped with blocking means for blocking the inlet 5 and/or the outlet 8 of the pre-compression chamber 1 at predefined times during the filling/emptying cycle. A blocking means placed at the outlet 8 is schematically shown in FIG. 4. This blocking means is generally a moveable screen 30 that is placed before the pre-compression chamber's outlet 8 when the crop material is accumulating inside the pre-compression chamber. As soon as the chamber is filled, the blocking means is removed, allowing a batch of pre-compressed material to be pushed into the baling chamber. The movement of the blocking means therefore needs to be synchronized with the belt movement. For example and with reference to FIG. 2, the blocking means at the outlet 8 may be opened at $t_o$, and closed at $t_c$. Such a blocking means is an additional means (in addition to the smooth belt portion 15) for preventing crop material being pushed towards the baling chamber when the plunger is not in the correct position. Likewise, a blocking means 31 may be present at the inlet 5 of the pre-compression chamber (alone or together with the blocking means at the outlet), its operation being timed with the belt movement, so as to close when a batch is being pushed upward into the baling chamber, and to open when fresh material needs to be introduced into the pre-compression chamber. The opening and closing of a blocking means 31 at the inlet may be timed inversely to the blocking means at the outlet (i.e. opening at $t_c$ and closing at $t_o$ indicated in FIG. 2). The blocking means 30/31 may be brought into practice as a slideable or pivotable screen, as generally known in the art.

The invention claimed is:

1. An agricultural square baler comprising:
    a pre-compression chamber, having an inlet section, an outlet section and an upper and lower wall defining a channel between said inlet and outlet sections,
    a baling chamber having an inlet connected to the outlet of said pre-compression chamber so that pre-compressed material may be transported from the pre-compression chamber to the baling chamber, the baling chamber having-a plunger for forming rectangular bales,
    at least one conveyor belt configured to form at least a portion of at least one of said upper and lower wall of the pre-compression chamber, said conveyor belt being further configured so that the movement of the belt in at least one of said portion of the upper and lower wall takes place from the inlet towards the outlet of the pre-compression chamber,
    wherein said conveyor belt comprises at least two portions which are adjacently arranged in a direction of movement of the belt, said portions being configured to exert substantially different friction forces on material present in the pre-compression chamber, and the speed of said conveyor belt varies between a high speed and a low speed according to a predefined cycle.

2. The square baler according to claim 1, wherein said conveyor belt is configured to be actuated by a set of rolls arranged between said inlet and outlet sections of the pre-compression chamber.

3. The square baler according to claim 1, wherein said conveyor belt comprises two adjacent portions of essentially half the total length of the conveyer belt as measured in the direction of movement of the belt, said portions being configured to exert substantially different friction forces on material present in the pre-compression chamber.

4. The square baler according to claim 1, wherein said conveyor belt comprises two adjacent portions, the first portion having a length longer than the second portion.

5. The square baler according to claim 1, wherein said conveyor belt comprises two adjacent portions, the first portion having a length shorter than the second portion.

6. The square baler according to claim 1, wherein the first of said portions of the conveyor belt has a smooth surface and the second of said portions has a surface provided with tines or paddles.

7. The square baler according to claim 1, wherein one of said upper and lower walls is a fixed wall, and the other wall is formed by said at least one conveyor belt.

8. The square baler according to claim 1, wherein both the upper and lower walls of the pre-compression chamber are formed by at least one conveyor belt.

9. The square baler according to claim 1, further comprising a gate for blocking at least one of the outlet section and the inlet section of the pre-compression chamber.

10. The square baler according to claim 1, wherein the conveyor belt is configured for speed adjustment at different speeds.

11. The square baler according to claim 10, wherein the speed depends on the mass flow entering the pre-compression chamber.

12. A method for providing crop material to the baling chamber of a square baler, the square baler comprising a pre-compression chamber, having an inlet section, an outlet section and an upper and lower wall defining a channel between said inlet and outlet sections, the baling chamber having an inlet connected to the outlet of said pre-compression chamber so that pre-compressed material may be transported from the pre-compression chamber to the baling chamber, at least one conveyor belt configured to form at least a portion of at least one of said upper and lower wall of the pre-compression chamber, said at least one conveyor belt being further configured so that the movement of the at least one conveyor belt in at least one of said portion of the upper and lower wall takes place from the inlet towards the outlet of the pre-compression chamber, said at least one conveyor belt comprising at least two portions adjacently arranged in a direction of movement of the at least one conveyor belt, said portions being configured to exert substantially different friction forces on material present in the pre-compression chamber, and the speed of said at least one conveyor belt varies between a high speed and a low speed according to a predefined cycle, said method comprising the steps of:
    filling the pre-compression chamber with crop material while said at least one conveyor belt is moving,
    when said pre-compression chamber is filled with a batch of crop material, propelling said batch into the baling chamber by gripping the batch through the friction force exerted on said batch by a high friction portion of said at least one conveyor belt, thereby emptying the pre-compression chamber.

13. The method of claim 12, wherein the speed of said at least one conveyer belt is increased prior to the step of propelling said batch into the baling chamber, and decreased after said step.

14. The method of claim 12, further comprising the steps of:
    when a totality of said high-friction portion is turned away from the interior of the pre-compression chamber, setting the conveyor belt speed at a first value suitable for gathering material into the pre-compression chamber, thereby filling said chamber,
    when the totality of said high-friction portion is turned towards the interior of the pre-compression chamber, increasing the belt speed to a second value, higher than the first, thereby emptying the pre-compression chamber into the baling chamber.

* * * * *